Inventors:
Cyril J. Allen
Alan L. Bliss
Ian D. B. Millar
By Kemon, Palmer, Stewart & Estabrook
Attorneys Inventors:
Cyril J. Allen
John L. Bliss
Ian D. B. Millar
By Kemon, Palmer, Stewart & Estabrook, Attorneys Inventors:
Cyril J. Allen
John R. Bliss
Ian D. B. Millar
By Kemon, Palmer, Stewart & Estabrook, Attorneys Inventors:
Cyril J. Allen
John L. Bliss
Ian D. B. Millar
By Kemon, Palmer, Stewart & Estabrook
Attorneys United States Patent Office 3,443,024
Patented May 6, 1969

3,443,024
SYNCHRONISING OF PERIODIC SIGNALS

Cyril Joseph Allen, Stamford, John Llewelyn Bliss, London, and Ian David Balfour Millar, Wembley, England, assignors to The Marconi Company Limited and Standard Telephones & Cables Limited, Strand, London, England Filed Feb. 28, 1966, Ser. No. 530,440
Claims priority, application Great Britain, Mar. 5, 1965, 9,540/65
Int. Cl. H04n *1/46, 9/00*
U.S. Cl. 178—5.2 7 Claims

ABSTRACT OF THE DISCLOSURE

In known telephone slave locking systems the oscillator at a remote station feeding a local station is subject to feedback control from the local station to maintain synchronism between the synchronising waveform available at the local station and the synchronising waveform received at the local station from the remote station. In this invention the phase error at the local station is quantised and the only control signal fed back to the remote station is a code signal calling for a frequency shift at the oscillator at the remote station.

Figure 1:
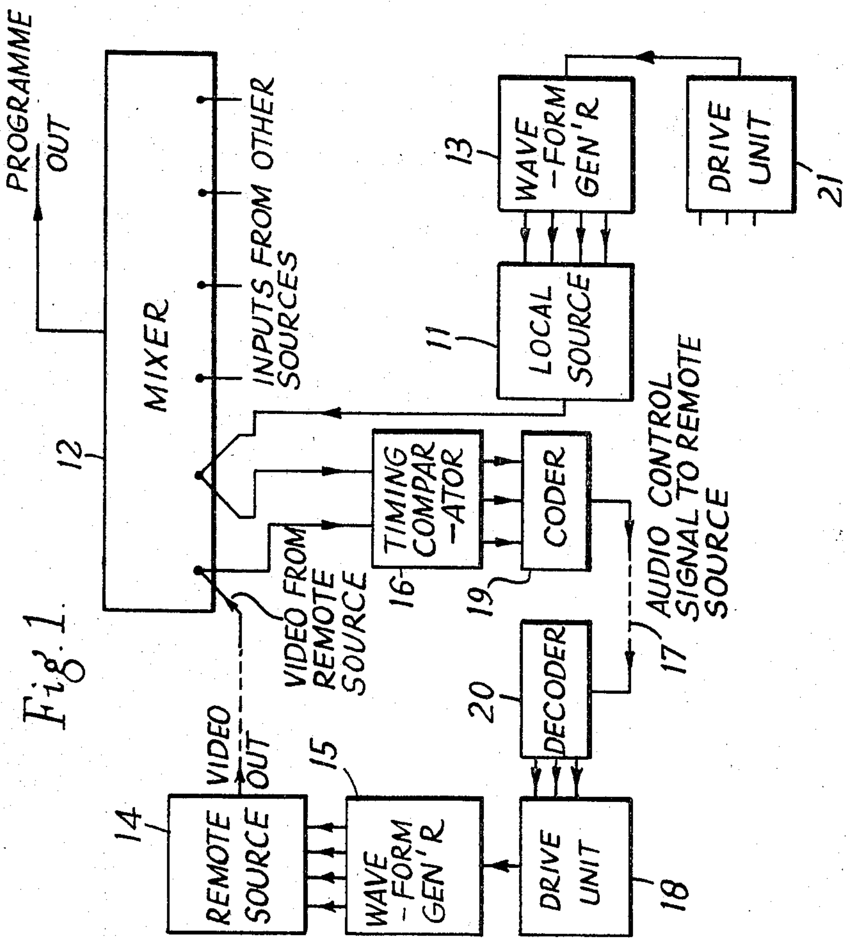

This invention relates to automatic television synchronising systems for synchronising remote programme sources with a local station fed by the remote sources and is concerned with a system of the type in which a remote source is controlled by feedback information from the local station. This may be referred to as a slave locking system to distinguish from the other system which is used, namely synchronising the local station to the signal received from a remote source. This may be referred to as generator locking and does not require a feedback path. Whilst the present invention concerns a slave locking system, it will later be explained that it may readily be converted to a generator locking system when so required.

The invention will be described in the main in relation to a single remote source and a single local station for the sake of simplicity. Obviously a plurality of remote sources may be slaved to the local station and it will also be shown that sources may be slaved in tandem, i.e. a first remote source is slaved to a local station which is however itself a remote source in relation to a further local station to which it is slaved.

The basis of any slave locking system is that the local synchronising waveform is compared with the waveform received at the local station from the remote source to detect any phase error. Feedback to the remote source is used to correct the error. The earliest attempts to do this utilised feedback of the twice-line-frequency signal itself, i.e. the signal used to drive the waveform generator, with its phase adjusted at the local station as required to eliminate the error. This gives rise to difficulties because the bandwidth required for the feedback path exceeds that which is economically available and secondly because the system is very susceptible to noise and cannot be used over long distances. The first difficulty was largely overcome by transmitting a sub-harmonic of the said frequency to the local source at which use was made of frequency multiplication and attempts have been made to reduce the noise problem by incorporating very narrow band filters in the feedback path. The second difficulty has nevertheless remained and these prior art systems have continued to be limited by noise and stability problems to use over relatively short distances.

It has also been proposed to use an audio-frequency feedback signal which is not directly related to the twice-line-frequency signal but which is modulated in some way, for example frequency-modulated, by a phase error signal. This latter signal is detected at the remote source and effects automatic control of the instantaneous frequency of a twice-line frequency drive oscillator at the remote source. This does not eliminate the fundamental susceptibility of the system to noise, which can completely throw out the synchronisation.

It has also been proposed to add to the system described in the previous paragraph a coarse feedback control in steps of one line per field. Thus when a phase error exists at the local station which exceeds a certain amount, one or the other of two audio tones (depending upon the sign of the phase error) is transmitted with the modulated feedback signal and causes the line pulse counter which controls the generation of frame pulses to count one more or one less line pulses, as required to tend to correct the error. The addition of this means of coarse control does not overcome the problems existing with the fine control and introduces its own problems. A jump of one line in a field is so large a correction that serious problems will arise with regard to overshooting and loop stabilty over distances of any length. What is more, a separate waveform generator must be set aside at the remote source for the material being sent to the local station. Assuming the remote source also to be transmitting other programme material in its own locality it is not possible to use a single waveform generator for the whole remote source because one-line-per-field jumps induced under the control of the local station would have too drastic an effect on the transmission of the said other material.

The object of the present invention is to provide a system which overcomes all of the problems discussed above, which is more or less immune to noise in the feedback path, can tolerate frequency shifts in a carrier system, requires very little bandwidth in the feedback path and is capable of operation over the largest of distances required without introducing stability problems. It is a further object to provide a system which is of such a nature as to be applicable immediately to the similar synchronisation of colour sub-carriers, with which the above-described systems are completely unsuited to cope. It is a further object to provide a system which is completely flexible as to the synchronisation of large numbers of sources whether in a slave locking system or a generator locking system or a mixture of both.

According to the present invention invention there is provided an automatic television synchronising system comprising a remote source feeding a local station, means at the local station adapted to compare the received synchronising waveform with the local synchronising waveform and to classify any phase error therebetween in one of a plurality of classes including at least one class for a phase error of each sign and including a nominally "no error" class comprehending a finite range of errors about zero phase error, a feedback communication path adapted to transmit to the remote source a coded signal indicating the class of the error at any time and means at the remote source adapted to select one of a plurality of different output frequencies for the synchronising oscillator at the remote source in accordance with the class of the error. It will be understood that the oscillator at the remote source supplies a twice-line-frequency signal and may in addition supply a colour sub-carrier. The different oscillator frequency may be selected for a brief interval so as to give only the effect of a discrete change of phase in the twice-line-frequency signals.

There must be at least three error classes, namely "phase late," "no error" and "phase early." Preferably however there are five classes for effecting synchronisation, namely the three listed above and "phase very late" and "phase very early." It is conceivable that the largest terrestrial distances might make it necessary to extend to seven classes, but five classes are likely to be sufficient in general.

The magnitude of the phase change induced by a change from one of the said output frequencies to another one of these frequencies for the delay time round the complete error correction loop should be insufficient to cause the system to overshoot and hunt about the stable state. Herein lies the importance of the "no error" class comprehending a finite range of errors about zero phase error, as will become clear from the detailed example to be described subsequently. The maximum phase correction effected in an interval equal to the delay time round the loop should not exceed the width of the "no error" class. There is no difficulty in practice with five error classes in ensuring stability up to 3000 miles.

Since so few code combinations, e.g. five, are necessary, the system may be made extremely robust. Preferably a three bit code is used and each bit may be represented by a distinct audio tone. However, the invention is not limited to the particular way of sending back the feedback information. For example a pulse code superimposed, in a manner known per se, on a return video waveform may be used.

When five error classes are used the "very late" and "very early" classes will effect a coarse control and the "late" and "early" classes will effect a fine control. However even the coarse control should be made sufficiently gradual, substantially more so than a line in a frame, for the effect on a picture to be substantially unnoticeable and to allow other equipment at the remote source, not feeding the local station, including even video recording equipment, to continue to operate properly even although they share the local oscillator whose frequency is adjusted.

One way of effecting the local oscillator adjustment is to use a high frequency master oscillator and a frequency divider with variable feedback determining the divisor. In this case there will be the distinction over the prior art using such a divider and described above that the divider input and output frequencies are now much higher respectively than line frequency and frame frequency.

Because even the coarse adjustment is so gradual the system is virtually immune to noise. The worst noise will cause only slow changes. This arises because, in contrast to all the prior systems discussed above, no use is made of error feedback proportional to the magnitude of the error. The system of the present invention merely detects the presence of an error exceeding a certain magnitude, quantizing the magnitude in say two classes for either sign, and causes the remote source to correct gradually until the error disappears. No signal can cause a violent change.

Figure 2:
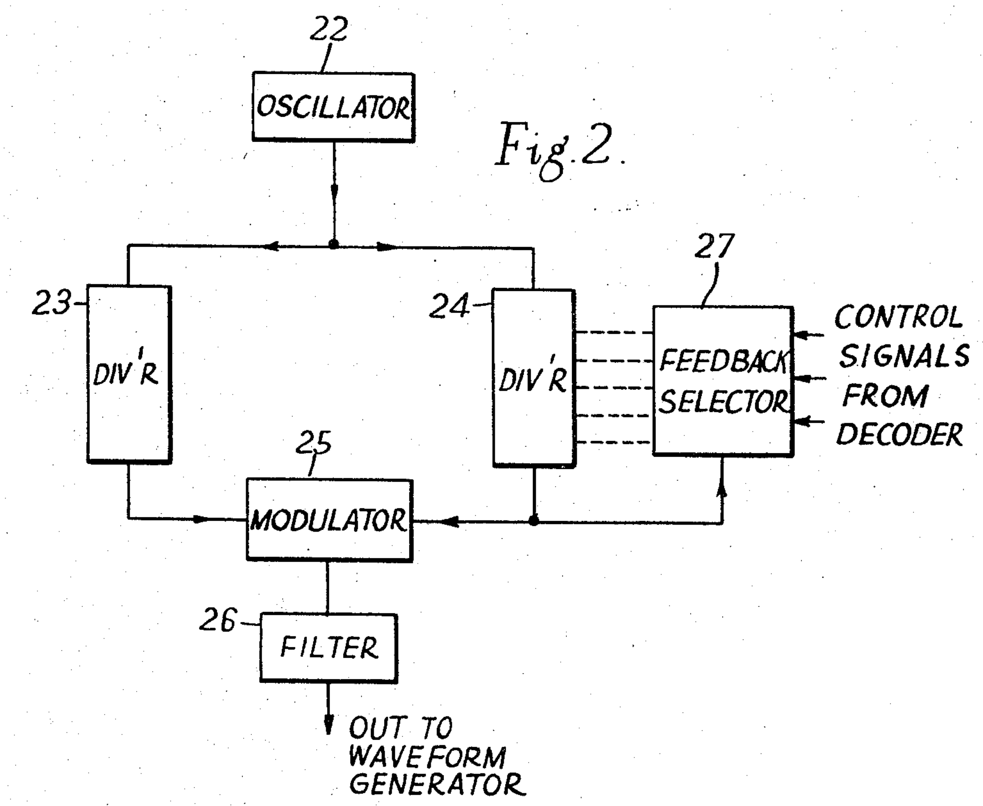
Figure 3A:
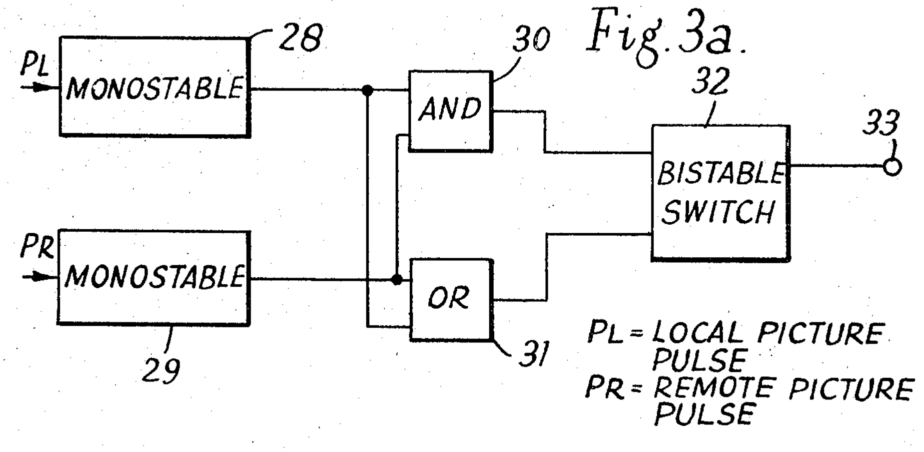
Figure 3B:
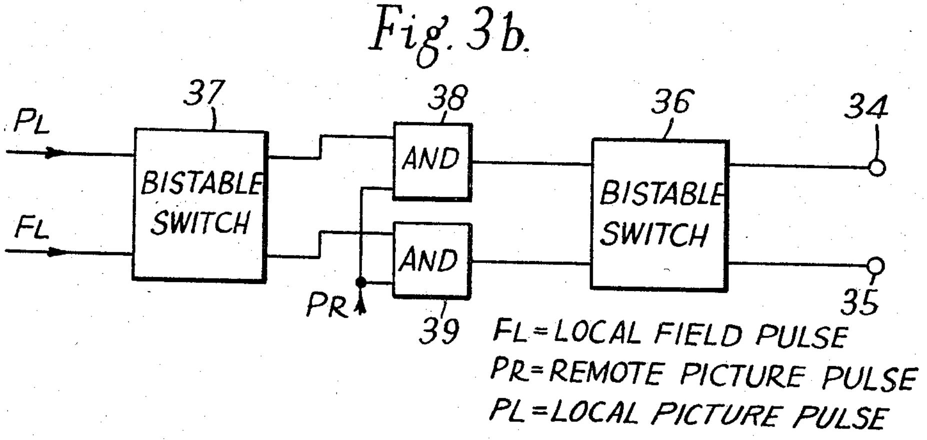
Figure 3C:
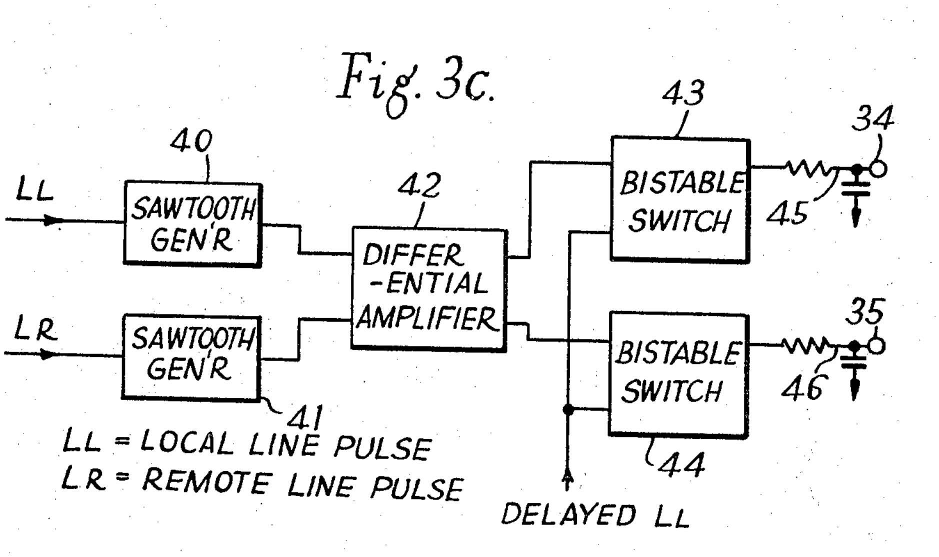
Figure 4:
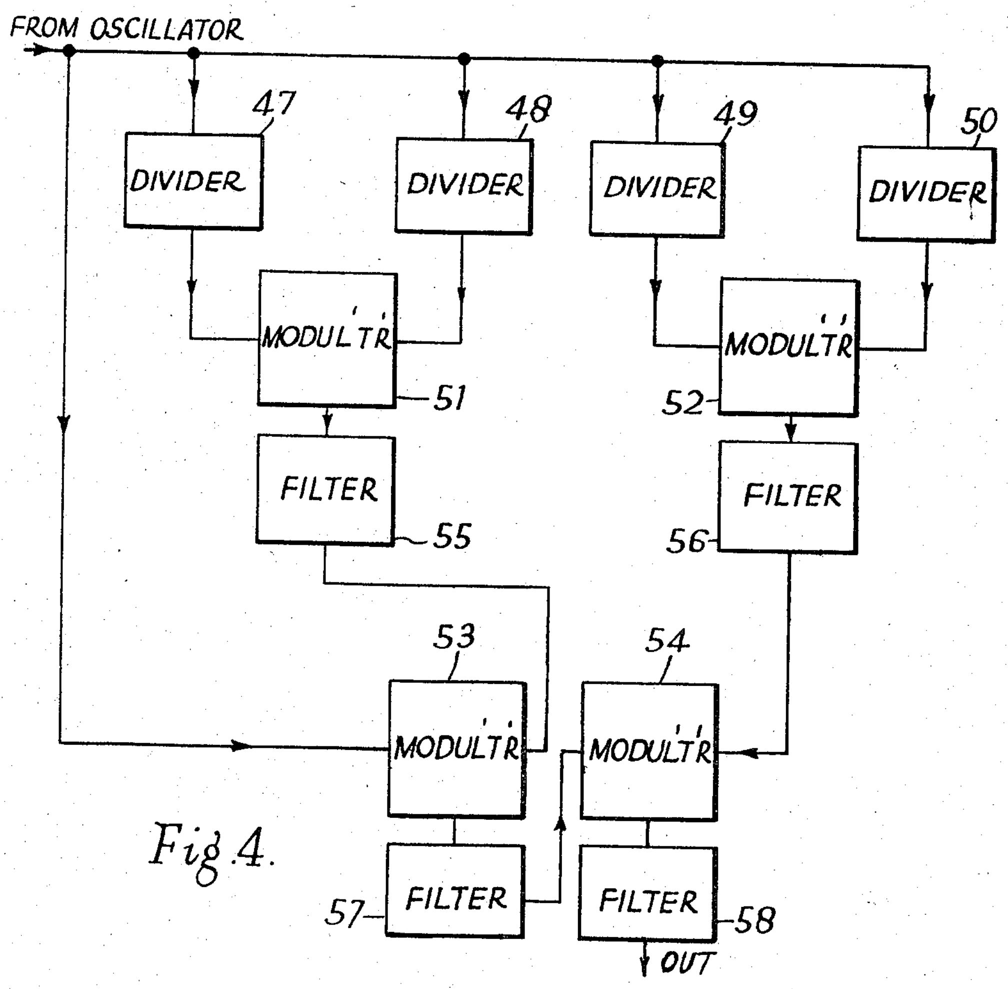

The invention will now be described in more detail, by way of example, with reference to the accompanying drawings, in which:

FIG. 1 is a block circuit diagram of synchronising apparatus embodying the invention, FIG. 2 is a block circut diagram of a drive unit shown in FIG. 1, FIGS. 3(*a*), (*b*) and (*c*) are block circuit diagrams of parts of a time comparator shown in FIG. 1, and FIG. 4 shows part of a modified apparatus adapted for use with colour television signals.

In FIG. 1 there is shown apparatus for synchronising television signals arriving at a central control point from a number of remote sources with television signals generated at the central control point by a local source. The television signals consist of a series of consecutive pictures, each pitcure being composed of two interlaced fields. In this embodiment signal sources are regarded as being synchronous when the signals thereof arrive at the central point with corresponding leading edges of their synchronising waveforms coincident in time, within limits of about $\pm 0.1$ μs. The general arrangement of the apparatus is shown in FIG. 1. A group of local picture sources (of which one source 11 is shown) are adjacent to a mixer 12 and are controlled by a waveform generator 13, while a remote source 14 is controlled by another generator 15. One local source 11 serves as a reference, and the timing of the signals arriving from the remote source 14 is compared in a timing comparator 16 with the timing of the signals from the reference source 14. The timing comparator 16 constitutes an error detector. The comparison device 16 originates a control signal which is fed back to the remote source 14 via an auxiliary channel 17 where the timing of the waveform generator 15 is controlled by a drive unit 18. In FIG. 1 the auxiliary channel 17 is shown as a telephone circuit, associated with suitable coding and decoding equipment 19 and 20. Other methods of transmission can be used. The embodiment described is intended to be used with 625-line 50 field standards, but the arrangement is adaptable for other standards, provided that these have stable line and field frequencies, i.e. that they are not mains locked, and it can be extended to handle NTSC or other colour sources using phase modulation of a sub-carrier.

The drive unit 18 feeds the waveform generator 15 with a twice-line-frequency signal. The drive unit 18 derives its output from a crystal oscillator, precise and stable within $\pm 1$ part in $10^7$. To facilitate the use of apparatus embodying the invention to handle colour signals, the oscillator operates at the 625-line NTSC chrominance subcarrier frequency (4.4296875 mc./s.$=567\frac{1}{4}$ times twice line frequency). The waveform generator 13 controlling local sources at the mixing point is driven by a similar master drive unit 21. The drive unit 18 has five possible modes of operation, selected by signals fed thereto from the decoder 20. These modes are:

(a) Output frequency precisely $\frac{4}{567}$ times the oscillator frequency. The unit operates in this mode in the absence of control signals.

(b) Output frequency increased by 1 part in 5600, compared with mode (a).

(c) Output frequency decreased by 1 part in 5600, compared with mode (a).

(d) Output frequency as mode (a) but with the output phase advanced by a discrete step of about 0.2° at the start of each picture period.

(e) Output frequency as mode (a) but with the output phase retarded by a discrete step of about 0.2° at the start of each picture period.

A phase step of about 0.2° shifts the timing of the driven waveform generator by about 18 ns. As the drive unit has only five possible modes, the control signals which select a wanted mode need have only five distinguishable states, which may be, for example, five of the eight possible combinations of three audio tones, each of which is either present or absent. Such a signal is very robust and able to resist all but extreme levels of noise or other interference. Possible combinations of three tones $f1$, $f2$, $f3$ are shown in the following table. "1" indicates the presence and "0" the absence of a tone.

| f1 | f2 | f3 | Mode of drive unit |
|---|---|---|---|
| 0 | 0 | 0 | (a) |
| 0 | 1 | 1 | (a) |
| 1 | 1 | 0 | (b) |
| 1 | 0 | 1 | (c) |
| 0 | 1 | 0 | (d) |
| 0 | 0 | 1 | (e) |

The use of two combinations including 000 to initiate mode (a) ensures that this mode is established should the control circuit be interrupted, while the combination 011 in normal use ensures that some control signal is always present, which facilitates the use of automatic gain control.

The simplicity of the control signals is matched by equal simplicity in the time comparison device, which is required to distinguish five conditions:

(a) Nominally no error (say <30 ns.).

(b) Remote signal late by 8 μs. or more, i.e. very late.

(c) Remote signal early by 8 μs. or more, i.e. very early.

(d) Remote signal late by less than 8 μs.

(e) Remote signal early by less than 8 μs.

The control signals are such as to switch the drive unit into the mode corresponding to the state of the timing error. Thus condition (a) puts the drive unit into mode (a), condition (b) puts it into mode (b) and so on. Errors of 8 μs. or more are detected by comparing picture pulses (alternate field pulses) from local and remote sources. The timing error is thus sampled at 40 ms. intervals so that information that the error has changed from more than 8 μs. to less than 8 μs., an event which may happen anywhere within a picture period, may become available up to 40 ms. late. The control signal initiated by a particular sample is maintained throughout the following picture period.

Errors less than 8 μs. are detected by comparing the edges of corresponding line synchronizing pulses from the local and remote sources. There is therefore no significant sampling delay. The comparison is inhibited while the error exceeds 8 μs., so that there is no risk that the line edges being compared will not be corresponding ones.

In addition to sampling delay, account must be taken of transmission delay round the control loop, which is here assumed to be less than 40 ms. Some delay occurs in the terminal equipment, mainly in filter networks. In the present embodiment this terminal delay is less than 10 ms., with the result that the external delay may be allowed to reach 30 ms. For example, with transmission velocities of $10^5$ miles/sec., the loop can be up to 3000 miles long.

When the control loop including the channel 17 is first closed, assuming the initial error to be more than 8 μs., the remote drive unit 18 is switched into mode (b) or mode (c) according to the direction of the error, whereupon the waveform generator 15 advances or retards its timing by 1 part in 5600 (180 μs./sec. or 7.2 μs./picture period approximately).

At some instant the timing of the remote waveform generator 15 will reach a condition where, if the drive unit 18 could be switched at once into mode (a), the timing error would be 8 μs. The drive unit cannot be switched at once, because of the sampling delay and the transmission delay. The sum of these delays may, in the limit, approach 80 ms. The drive unit therefore remains in mode (b) or mode (c) too long and overshoots in timing by up to 14.5 μs. The reason for making the large error comparator insensitive to errors less than 8 μs. will now be evident. It ensures that the first stage of the synchronising process ends with the error within the "small error" range of ±8 μs., so that the small error comparison can begin. Without this precaution the system could oscillate indefinitely. Once the error becomes less than 8 μs. the remote drive unit is switched to mode (d) or mode (e) according to the sign of the error, which is not necessarily that of the initial error, and correction proceeds in steps of 18 ns. per picture period (0.45 μs./s.) aided or opposed by the relative drift of local and remote oscillators, which drift, at the limit of the prescribed tolerance, is 0.2 μs./s. The last few microseconds of error is thus corrected at a rate between 0.25 and 0.65 μs./s. until the error nominally ceases to exist, whereupon the remote drive unit reverts to mode (a). The remote source is then comfortably within the prescribed limit for synchronism of ±0.1 μs. Again the fact that an error less than 30 ns. is nominally no error taken with the size of the correction steps in mode (d) and mode (e) ensures that overshoot and instability cannot take place. When the relative drift between oscillators allows the error to increase until it again exceeds 30 ns. the drive unit is switched into mode (d) or mode (e) for one picture period to restore the situation.

Because the loop transmission time is less than a picture period the effect of one correcting step is assessed before the decision has to be made whether or not to make another one. There is therefore no overshoot as explained above. To operate with loop distances greater than 3000 miles one possibility is to make correcting steps in alternate picture periods. The "small error" range is increased to about ±12 μs. and the stability of the oscillators has to be improved by a factor of two. This modification allows stable control to be effected at loop lengths of up to 7000 miles. Another possibility lies in extending to the use of seven error classes as already explained.

The size of the correcting steps, 18 ns., is chosen to be small enough to produce no visible disturbance in a displayed picture. The result of each correcting step can just be detected by close scrutiny of a critical display of two fixed patterns superimposed, one from a source subjected to correcting steps, the other operating normally. A modification of the invention, described hereinafter, reduces the frequency of correcting steps to one in many seconds, with the result that the correcting steps cannot be detected visually at all.

A simplified circuit diagram of the drive unit 18 is shown in FIG. 2. An oscillator 22 drives two divider chains 23 and 24, consisting of cascaded binary counters with feedback. The outputs of the dividers 23 and 24 feed a modulator 25. The output of the drive unit is taken from the modulator 25 through a filter 26 which selects that component whose frequency is the sum of the fundamental frequencies of the divider outputs. The divider 23 has a fixed ratio of 154:1. The divider 24 has alternative feedback arrangements selected in a feedback selector 27 by gates controlled by signals fed into the unit from the decoder 20. This part of the circuit is conventional and is not shown in detail.

In mode (a) the divider 24 has a ratio of 1782:1 so that, starting with an oscillator (22) frequency of 567¼ times twice-line-frequency, the output frequencies of the dividers 23 and 24 are 81/88 and 7/88 times twice-line-frequency respectively. The sum of these frequencies is twice-line-frequency.

In mode (b) or mode (c) the ratio of the divider 24 is changed to 1778:1 or 1786:1, causing the output frequency of the unit to increase or decrease by one part in 5600 approximately. This amount of change is a compromise between the need to correct large initial errors quickly, and the need to avoid disturbance of any equipment including devices with inertia (such as video tape and film machines) which may be being controlled by a waveform generator which is being synchronised. The greatest possible initial error (20 ms.) is brought within the ±8 μs. limits in 112 seconds.

In mode (d) or mode (e) the ratio of the divider 24 is changed to 1781:1 or 1783:1 for one cycle only of the divider at the start of each picture period. The restriction to a single divider cycle can be effected using conventional circuit techniques, for instance by a pair of bistable switches driven by picture pulses and by divider output pulses. A picture pulse sets the first switch and a divider output pulse resets it. If the appropriate control signal is present the resetting action sets the second switch which changes the feedback connections so that divider 24 executes a modified cycle. At the end of the modified cycle the output pulse resets the second switch, and the division ratio reverts to normal. This sequence of events is initiated by every picture pulse so long as a control signal is present.

A change of division ratio by one, for one divider cycle only, has the effect of advancing or retarding the divider output pulse, at the end of the modified cycle, by one period of the input signal to the divider. This time shift is equivalent to a phase shift of the fundamental component of the divider output by $360°/1782=0.202°$ approximately. This phase shift is conserved by the modulator, and appears in the output. A phase shift of 0.202° in a signal whose period is 32 $\mu$s. is equivalent to a time shift of 18 ns.

FIGS. 3(*a*) (*b*) and (*c*) are explanatory circuit diagrams showing the manner of operation of the time comparator 16 in FIG. 1. This device is complicated in detail, but its basic principles are simple. It has three outputs, each of which assumes one of two D.C. levels, which may be taken as "0" or "1."

The first output is at level "1" when a large error is present in the signal of the remote source 14 (FIG. 1). The output of the time comparator 16 is derived from a comparison of picture pulses from the local and remote sources 11 and 14. Line and field pulses from these sources are obtained from conventional synchronising separator circuits and picture pulses are produced by feeding line and field pulses into "and" gates which produce an output on those alternate field pulses which coincide with line pulses. Referring to FIG. 3(*a*), the picture pulses drive monostable multivibrators 28 and 29 which produce pulses 8 $\mu$s. wide. These 8 $\mu$s. pulses feed an "and" gate 30 and an "or" gate 31 in parallel. The outputs of these gates drive a bistable switch 32 which feeds the first output terminal 33. When there is an error greater than 8 $\mu$s. the "or" gate 31 has an output but the "and" gate 30 has not. The "or" gate output sets the bistable switch 32 to produce a "1" signal at the output terminal 33. When the error is less than 8 $\mu$s., the "and" gate 30 also produces an output and resets the switch within a time interval of 8 $\mu$s. after it has been set. The coding equipment fed from the comparator output is too sluggish to respond to such a narrow pulse.

The second and third outputs of the comparator 16 indicate the direction of the error, by exhibiting conditions "0," "1" or "1," "0" at output terminals 34 and 35 (FIG. 3(*b*)). FIG. 3(*b*) shows that these outputs are taken from either side of a bistable switch 36, which is driven from another bistable switch 37 via two "and" gates 38 and 39. The switch 37 is driven by picture and field pulses from the local source 11. It therefore changes state at the end of each field period. Secondary inputs to the "and" gates 38 and 39 are provided by picture pulses from the remote source 14. The state of the output switch 36 depends upon the state of the input switch 37 at the moment of arrival of the remote picture pulses at the "and" gates 38 and 39.

When the error becomes less than 8 $\mu$s. control of the second and third outputs (terminals 34 and 35) of the comparator is transferred to a small error detector, which compares line pulses from the two sources 11 and 14. FIG. 3(*c*) shows the general arrangement. The line pulses drive sawtooth generators 40 and 41, which feed a differential amplifier 42 having a push pull output. The outputs consist of pulses whose direction depends on the sense of the error. The differential amplifier outputs feed two bistable switches 43 and 44 which are set by a local line pulse delayed by almost a whole line period. One or other of the bistable switches 43 and 44 will be reset by the differential amplifier 42 to produce an output signal. The output terminals 34 and 35 are fed from the bistable switches 43 and 44 through smoothing circuits 45 and 46 which maintain the output during the short interval between a switch being set and being reset. When the error becomes very small neither output of the differential amplifier is able to reset a switch, and the comparator has no output.

The coding and decoding devices 19 and 20 which transform the D.C. signals from the time comparator 16 into combinations of audio tones, and which transform the tones back into D.C. signals to operate the drive unit 18, are conventional and require no detailed description. It is however worth noting that a substantial part of the transmission delay which occurs in the terminal equipment is due to the filters used to isolate the three tones in the decoder 20. To keep this contribution to the overall delay small the three tones must not be too close in frequency. In the present embodiment frequencies of 800, 1200 and 1600 cycles per second are used.

A modification of the invention, which is desirable for monochrome working, and which is essential for colour working, provides automatic means to reduce the frequency difference between local and remote oscillators in the drive units 21 and 18. Without this feature the correcting steps may occur several times a second and, as was stated hereinbefore, the effects can sometimes be observed. With the modification the frequency of the correcting steps is reduced to two or three steps per minute when the effects are not detectable. The control signals as already described provide some information as to the relation between the oscillator frequencies. For example if the remote source 14 is maintained in synchronism by advancing its timing in steps, the remote oscillator frequency is relatively low, and conversely. Moreover the frequency of the correcting steps provides a rough measure of the frequency difference. It is possible to use this information to reduce the remote oscillator error in a very simple way. The oscillator is provided with a fine frequency control, effected by varying the bias on a variable capacitance diode in the oscillator maintaining circuit for example. This bias is derived from a potentiometer driven by a stepping motor. Nothing happens to the motor whilst synchronism is being established initially, but when correcting steps occur at intervals greater than 40 ms. to maintain synchronism, each correcting step is made to move the motor one step in the appropriate direction. Thus if correcting steps which advance the remote waveform generator timing are made the motor is stepped in a direction to increase the remote oscillator frequency. The correcting steps then occur at increasing intervals until ultimately the oscillator frequency becomes too high, when the next correcting step retards the waveform generator timing and puts the oscillator frequency too low. Thereafter the oscillator changes from too low to too high and back again indefinitely, at intervals of 30 seconds or more. As it is possible to make the oscillator frequency steps as small as 1 part in $10^9$, the average oscillator error is held within similar limits.

Apparatus embodying the invention can be used to synchronise sources producing colour signals, in which it is necessary to control the phase of colour reference in a signal from a remote source so that it is within $\pm 1$ or 2° of that of the reference from local sources. A phase comparator compares the phases and produces one of three outputs according as the phase error is a lag, or is nominally "no error," or is a lead. These outputs can for example be coded for transmission using an additional tone $f4$ whose presence indicates that the tones $f2f3$ are to be interpreted as relating to subcarrier phase, and whose absence leaves $f2$ and $f3$ controlling synchronisation timing, as in monochrome working. At the remote source the control signals are used to advance or retard the phase of the chrominance sub-carrier oscillator in small discrete steps once per picture period. This phase adjustment goes on independently of the drive unit timing adjustments. With such a discontinuous control the frequency difference between local and remote oscillators must be made small enough, using automatic frequency control, for the cumulative phase error during a picture period to be negligibly small. If, for example, the oscillator frequency difference is made of the order 1 part in $10^9$, the cumulative error is less than 0.1°. FIG. 4 shows a circuit arrangement for producing discrete steps of phase cf. 1.5°, using principles similar to those of the drive unit described with reference to FIG. 2. The oscillator of, say, the remote drive unit 18 (FIG. 1) drives four divider chains 47, 48, 49 and 50. The dividers 47 and 48 feed a modulator 51, while the dividers 49 and 50 feed a modulator 52. The dividers 47 and 49 have normal ratios of 16:1, and dividers 48 and 50 have normal ratios of 15:1. The modulators 51 and 52 feed filters 55 and 56 respectively, which filters each select the sum of the modulator input frequencies. The filters 55 and 56 therefore have the same output frequencies. The output of the filter 55 is fed to a modulator 53, in which it is added to the signal from the oscillator of the drive unit 18 (not shown in FIG. 4). The output of the modulator 53 is fed to a filter 57 which selects the sum of the input frequencies fed to the modulator 53. The output of the filter 57 is fed in turn to a further modulator 54 where it is combined with the output of the filter 56. The output of the modulator 54 is then fed to a filter 58 which selects the difference of the input frequencies fed to the modulator 54, this output signal having a frequency equal to that of the oscillator of the drive unit.

Suppose that the ratio of the divider 47 is changed to 15:1 or 17:1 for one divider cycle. The phase of the fundamental component of the divider (47) output is advanced or retarded by 22.5°. Similarly, if the ratio of divider 48 is changed to 14:1 or 16:1 for one cycle, the effect is to advance or retard the phase of the fundamental component of the divider output by 24°. If then the ratio of the divider 47 is changed to 15:1 while at the same time that of the divider 48 is changed to 16:1, in each case for one divider cycle, the net effect is to retard the output of modulator 51 by 1.5°. Changing the ratio of the divider 47 to 17:1 while that of the divider 48 changes to 14:1 causes the output phase of the modulator 51 to advance by 1.5°. Such phase changes are conserved in the modulators 53 and 54 and appear in the final output signal. Similar operations on the dividers 49 and 50 have the same effect except that the sign of the output phase shift is reversed, as the modulator 54 is required to produce a difference rather than a sum frequency. In practice it is not convenient to change the ratio of a 16:1 divider to 17:1 as this involves either the use of five binary stages with feedback to every stage, or the use of a four stage divider with one input pulse inhibited instead of pulses being fed back. The use of a ratio of 17:1 is avoided by changing the ratio of the dividers 47 and 48 to 15:1 and 16:1 respectively to retard the output phase and to change the ratios of dividers 49 and 50 to 15:1 and 16:1 respectively to advance the output phase. The means for changing the division ratios in response to control signals, and to make the changes only once per picture period are similar to those adopted in the drive unit 18.

This description has assumed NTSC colour sources. Other types may require a modified subcarrier frequency, and other changes of detail, but not of principle.

For tandem working the drive unit 21 may itself be slaved to another drive unit in precisely the way described in relation to the unit 18. If it is desired to operate a generator locking system it is merely necessary to interchange the inputs to the comparator 16 and to apply its output to the drive unit 21. The communication channel 17 is not then required.

We claim:

1. In an automatic television system comprising a local station, a remote source feeding said local station, a feedback communication path between said station and source, and means at said local station adapted to compare the synchronising waveform received from said remote source with the local synchronising waveform and to transmit to said remote source over said path an error-correcting signal to control the frequency and phase of said received synchronising waveform, the improvement consisting in:

(a) said means at said local station are constructed and arranged to classify any phase error between said waveforms in one of a plurality of classes including at least one class for a phase error of each sign and a class which is nominally a "no error" class but which comprehends a finite range of errors about zero phase error;

(b) said means at said local station are further constructed and arranged to transmit to said remote station over said feedback communication path a coded signal indicating the class of the error at any time; and (c) said remote source comprises a synchronising signal source having a plurality of frequency settings corresponding to said error classes respectively and responsive to said coded signal for selection of its setting.

2. A system according to claim 1, wherein said means at said local station are constructed and arranged to classify any phase error in one of five classes, namely "phase very late," "phase late," "no error," "phase early" and "phase very early."

3. A system according to claim 2, wherein said synchronising signal source is responsive to the "phase very late" or the "phase very early" coded signal to select a reduced or increased frequency setting for as long as that coded signal continues to be received at said remote source.

4. A system according to claim 1, wherein at least one coded signal other than that denoting "no error" causes a frequency setting different from that corresponding to "no error" to be selected for a brief interval only at regular intervals (such as picture intervals) so long as the said one coded signal continues to be received at said remote source.

5. A system according to claim 1, wherein said synchronising signal source comprises a master oscillator, a frequency divider having a plurality of different divisor settings and means responsive to the different said coded signals to select the different divisor settings.

6. A system according to claim 5, comprising means at the remote source adapted to sense when phase corrections to the synchronising signal source output occur in the same direction more frequently than a predetermined rate and thereupon to effect a correcting change in the frequency of the master oscillator.

7. In an automatic colour television system comprising a local station, a remote source feeding said local station, a feedback communication path between said station and source, and means at said local station adapted to compare the synchronising waveform and colour sub-carrier received from said remote source with the local synchronising waveform and colour sub-carrier and to transmit to said remote source over said path an error-correcting signal to control the frequency and phase of said received synchronising waveform and colour sub-carrier, the improvement consisting in:

(a) said means at said local station are constructed and arranged to classify any phase error between said waveforms and sub-carrier in one of a plurality of classes including at least one class for a phase error of each sign and a class which is nominally a "no error" class but which comprehends a finite range of errors about zero phase error;

(b) said means at said local station are further constructed and arranged to transmit to said remote station over said feedback communication path a coded signal indicating the class of the error at any time; and (c) said remote source comprises a synchronising signal and colour sub-carrier source having a plurality of frequency settings corresponding to said error classes respectively and responsive to said coded signal for selection of its setting.

References Cited

UNITED STATES PATENTS

| | | | |
|---|---|---|---|
| 2,278,788 | 4/1942 | Knick | 178—69.5 |
| 2,379,744 | 7/1945 | Pfleger | 179—15 |
| 3,368,034 | 2/1968 | Dischert et al. | 178—69.5 |

ROBERT L. GRIFFIN, *Primary Examiner.*

C. R. VONHELLENS, *Assistant Examiner.*

U.S. Cl. X.R.

178—5.4, 69.5